UNITED STATES PATENT OFFICE.

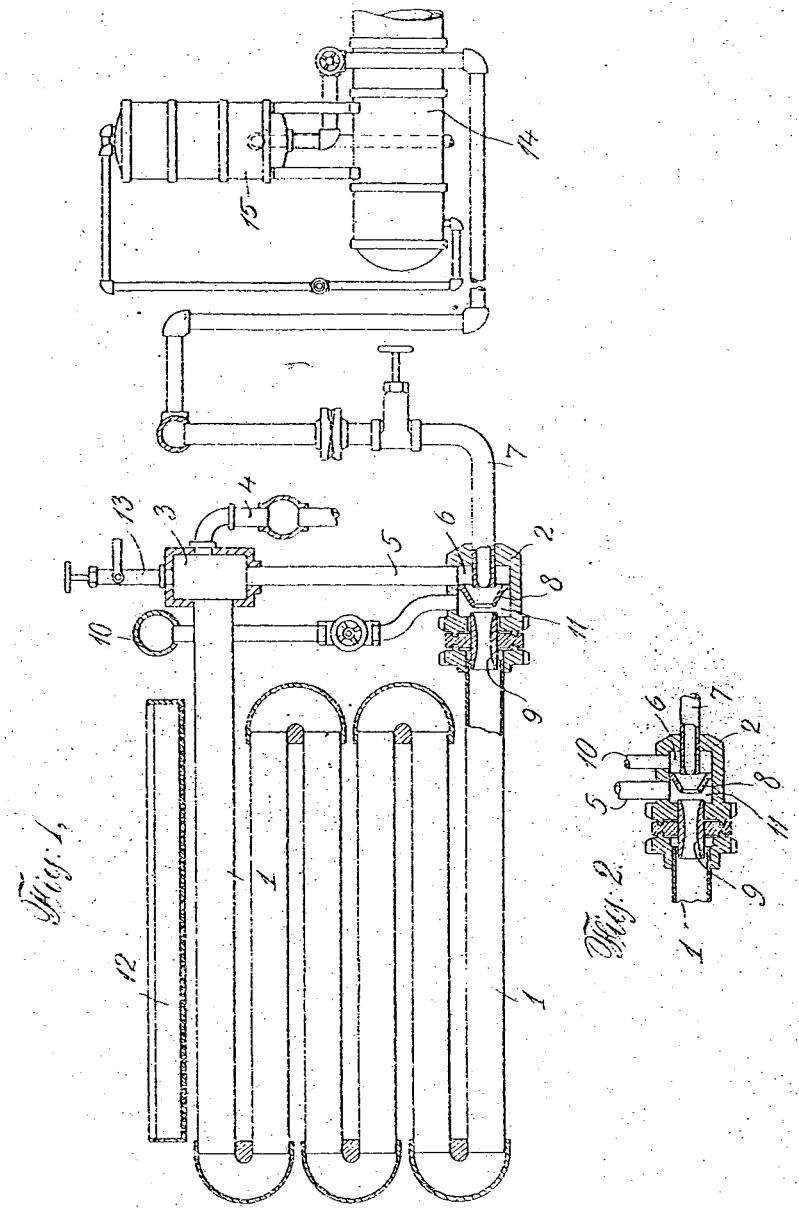

NICOLAI H. HILLER, OF CARBONDALE, PENNSYLVANIA.

PROCESS OF ABSORPTION AND APPARATUS THEREFOR.

1,199,380.  Specification of Letters Patent.  Patented Sept. 26, 1916.

Original application filed January 11, 1913, Serial No. 741,577. Divided and this application filed December 26, 1913. Serial No. 808,802.

*To all whom it may concern:*

Be it known that I, NICOLAI H. HILLER, a citizen of the United States of America, and a resident of Carbondale, in the county of Lackawanna and State of Pennsylvania, have invented a certain new and useful Process of Absorption and Apparatus Therefor, of which the following is a specification.

My invention relates to an improved absorber adapted for use as a portion of an absorption refrigeration apparatus, and to an improved process of absorption adapted to be carried out in such apparatus. In my improved absorber a jet of high-pressure and high-velocity weak liquor is injected, through the combining space of an injector, into an absorption conduit, and by induction action in that injector draws low pressure return gas into such combining space and thence into the absorption chamber, and also draws low pressure strong liquor from the discharge end of the absorption chamber into such combining space and into the said absorption chamber.

My invention consists in the novel absorber herein illustrated and described, and in the novel process of absorption herein described.

The objects of my invention are to increase the efficiency of absorbers, and of processes of absorption such as are carried out in absorption refrigeration apparatus; to eliminate surging, priming, and like disturbances; and to accomplish the above objects, by simple, inexpensive and reliable means.

I will now proceed to describe my invention with reference to the accompanying drawings, and will then point out the novel features in claims.

In the drawings: Figure 1 shows more or less diagrammatically an elevation and partial longitudinal section of an absorber embodying my invention; also portions of an absorption refrigeration apparatus in connection with which such absorber may work; and Fig. 2 is a fragmentary sectional view of an alternative form of injector adapted for use in the absorber shown in Fig. 1.

Referring first to Fig. 1. In this figure I have shown an absorber of the general type shown in my Patent No. 970,050, dated September 13, 1910, with additional connections such as provide for the return to the inlet portion of the absorber of a portion of the strong liquor produced in the absorber. In said figure, 1 designates a pipe coil to the lower end of which is connected an injector 2, and to the upper end of which is connected a chamber 3 from which chamber leads a discharge pipe 4. 5 designates a circulation or return pipe extending from the bottom of chamber 3 to the first combining space 6 of the injector 2. 7 designates a pipe through which the weak liquor (from the still or generator of the absorption apparatus) enters the injector. As such stills or generators are operated under considerable pressure, as is well known, this weak liquor entering the injector through the pipe or nozzle 7 has high pressure and, therefore, it issues from the nozzle 7 as high velocity. 8 and 9 designate nozzles of the injector. 10 designates a pipe through which gas (from the return line of the refrigeration apparatus and so from the expansion coils of that apparatus) enters the second combining space 11 of the injector. As is well known, the gas in the return line of an absorption refrigeration apparatus is under low pressure and naturally has low velocity. 12 designates means for flowing cooling water over the coil 1. 13 designates a vent valve. 14 designates diagrammatically the generator of the absorption refrigeration apparatus, and 15 the exchanger, these parts being shown diagrammatically only, and, for convenience, on a smaller scale than the absorber. In the operation of this absorber and in the carrying out of the process of absorption herein described, the high pressure high velocity jet of the weak liquor issuing into the first combining space 6 of the injector 2, induces flow of strong liquor down through circulation pipe 5 and through nozzle 8 into the second combining space 11, and so into nozzle 9, thereby inducing flow of the gas through pipe 10 into the second combining space 11, and thence into mixture with the jet from nozzle 8, the result being that the liquors and the gas are thoroughly intermingled and discharged into the pipe coil 1, and thence are caused to flow upward through such coil to chamber 3, a portion of the strong liquor thus produced passing out through pipe 4, and another portion passing down through pipe 5, as previously described. The circulating or return pipe 5 effectively neutralizes the effect of surging in the absorption conduit 1, since in the event that excessive discharge into chamber 3 occurs, the excess will immediately flow down through pipe 5 into the injector 2 and so will be returned to the coil 1. This not only automatically compensates for surging or priming, but tends to keep the coils of the absorption conduit or chamber 1 full of a mixture of liquid and gas at all times. Therefore, at times when relatively little gas is being returned to the absorber through pipe 10, nearly all of the strong liquor discharged at the upper end of conduit 1, may be returned, through pipe 5, and recirculated through the conduit 1, thus insuring intimate contact throughout the conduit 1, of gas with liquid, and avoiding opportunity for the gas to collect in large bubbles, or masses, and thereby to escape absorption. Because the conduit 1 is completely filled with a mixture of gas and liquid, or of liquid with gas thoroughly dissolved in it, the exchange of heat, through the walls of conduit 1, between the mixture of gas and liquid within that conduit, and the cooling fluid flowing over the conduit, is much more efficient than if considerable bodies of gas existed as such within the conduit 1; the rate of conduction of heat from an intimate mixture of liquid and gas being much higher than that from a body of gas.

This application is a division of my prior application Sr. No. 741,577, filed January 11, 1913.

As shown in Fig. 2 the relation of the gas return pipe 10 and the circulation pipe 5, with respect to the cone 8, may be reversed.

I am aware that heretofore it has been proposed, in an absorption refrigeration apparatus, to produce a combination of weak liquor, and gas to be absorbed, in an injector, the inductive agent in the operation of the injector being gas to be absorbed, delivered to that injector under considerable pressure, from a generator; the gas returned from the expansion coils of the refrigeration apparatus, to be absorbed, and the weak liquor from the generator, being drawn into the injector by the inductive action of such high pressure gas. But in such apparatus the injector is required to work against the high pressure of the generator, and also to do the work of drawing in the return low pressure gas and the weak liquor; and it cannot perform all of these tasks and operate effectively; and moreover, in such former apparatus referred to, there is no return to the injector-absorber, of a portion of the strong liquor produced in that absorber. In my apparatus herein illustrated and described the absorber 1 is under relatively low pressure, as compared with the pressure at which the weak liquor is delivered from the generator to the injector, and therefore the injector is enabled to operate effectively. Moreover, in the injector of my apparatus the inductive agent is not high pressure gas derived from the generator, but is high pressure weak liquor derived from a generator. In my apparatus the strong liquor from pipe 4 will be delivered into the generator by a suitable pump, as is common in modern absorption refrigeration apparatus.

The combining space of the injector is, in a general sense, a container for the absorbing liquid, in which container the absorbing liquid and the gas to be absorbed are mingled; and is so termed in certain of the following claims. The coil 1, chamber 3, and return pipe 5 constitute a coil located outside of this container, and having its ends opening into the latter; and the injector nozzle constitutes means for repeatedly circulating liquid from the said container through the conduit 1—3—5, before it passes out through the discharge conduit 4. The injector nozzle is, in a general sense, a pump and is so referred to in one of the following claims.

What I claim is:—

1. The herein described method of absorption which comprises introducing a jet of absorbing liquid at high pressure and velocity into a suitable conduit, and by the inductive action of such jet drawing gas to be absorbed into such liquid and into intimate mixture therewith, and thereby effecting absorption of the gas in the liquid and returning a portion of the resulting strong liquor to the inlet of such conduit and mixing the same with the incoming absorbing liquid and gas to be absorbed, and thereby keeping such absorbing conduit substantially full of a mixture of gas and liquid.

2. The herein described method of absorption which comprises introducing a jet of absorbing liquid at high pressure and velocity into a suitable conduit and by the inductive action of such jet drawing gas to be absorbed into such liquid and into intimate mixture therewith, and thereby effecting absorption of the gas in the liquid, flowing a cooling agent over such conduit, and thereby producing an exchange of heat between the liquid in such conduit and such cooling agent, and returning a portion of the resulting strong liquor to the inlet of such conduit and mixing the same with the incoming absorbing liquid and gas to be absorbed, and thereby keeping such absorbing conduit substantially full of a mixture of gas and liquid.

3. The herein described method of absorption which comprises mingling an absorbing liquid and a gas to be absorbed, and flowing the resulting mixture through a suitable conduit and abstracting heat from the mixture and continuously returning a portion at least of the resulting strong liquor into mixture with the incoming gas and absorbing liquid.

4. The herein described method of absorption which comprises mingling an absorbing liquid and a gas to be absorbed and flowing the resulting mixture through a suitable conduit and abstracting heat from the mixture through the walls of said conduit, and continuously returning a portion at least of the resulting strong liquor into mixture with the incoming gas and absorbing liquid.

5. The herein described method of absorption which comprises mingling an absorbing liquid and a gas to be absorbed and flowing the resulting mixture through a suitable conduit and abstracting from such mixture through the walls of said conduit the heat resulting from the absorption of the gas in the liquid, and continuously returning a portion at least of the resulting strong liquor into mixture with the incoming gas and absorbing liquid and thereby keeping the said conduit substantially full at all times.

6. Absorption apparatus comprising a conduit provided with means for introducing thereinto a mixture of absorbing liquid and gas to be absorbed, and for flowing such mixture through such conduit, and provided further with means for returning into mixture with the incoming gas and absorbing liquid a considerable proportion of the strong liquor issuing from such conduit, and means for abstracting from the liquid in such conduit heat resulting from the absorption of the gas in the liquid.

7. Absorption apparatus comprising a conduit provided with means for introducing thereinto a mixture of absorbing liquid and gas to be absorbed, and for flowing such mixture through such conduit, means for abstracting through the walls of such conduit heat resulting from the absorption of the gas in the liquid, and means for continuously returning into mixture with the incoming gas and absorbing liquid strong liquid resulting from the absorption.

8. Absorption apparatus comprising a conduit provided with means for introducing thereinto a mixture of absorbing liquid and gas to be absorbed, and for flowing such mixture through such conduit, means for abstracting from the liquid in such conduit heat resulting from the absorption of the gas in the liquid, and a return connection connecting the inlet and outlet of said conduit and adapted for the return into mixture with the incoming gas and liquid, of strong liquor issuing from the outlet of said conduit.

9. Absorption apparatus comprising an absorbing conduit having an injector at the receiving end thereof, means for supplying high pressure weak liquor to the nozzle of such injector, means for supplying gas to be absorbed to the combining space of such injector, and a connection from the discharge end of such absorption conduit to the combining space of such injector, adapted for return of a portion of the strong liquor produced in the absorber to the inlet of such absorber.

10. Absorption apparatus comprising an absorbing conduit having an injector at the receiving end thereof, means for supplying high pressure weak liquor to the nozzle of such injector, means for supplying gas to be absorbed to the combining space of such injector, and a connection from the discharge end of such absorption conduit to the combining space of such injector, adapted for return of a portion of the strong liquor produced in the absorber to the inlet of such absorber, said injector comprising an injector nozzle intermediate the points of connection of the source of gas supply and the means for the return of a portion of the strong liquor to the combining space of such injector.

11. Absorption apparatus comprising one or more return bend pipe coil units the sections of each unit arranged one above another, an injector connected to the lower end of each such unit, such injector comprising a nozzle and a combining chamber, means for supplying high pressure weak liquor to the nozzle of such injector, means for supplying gas to be absorbed to the combining space of such injector, and a return conduit connecting the upper portion of such pipe coil unit to the combining chamber of such injector, such conduit adapted for the return to the injector and so to the absorbing unit, of a portion of the strong liquor produced in the said unit, and means for flowing a cooling medium over such absorbing unit.

12. Absorption apparatus comprising one or more return bend pipe coil units, the sections of each unit arranged one above another, an injector connected to the lower end of each such unit, such injector comprising a nozzle and a combining chamber, means for supplying high pressure weak liquor to the nozzle of such injector, means for supplying gas to be absorbed to the combining space of such injector, and a return conduit connecting the upper portion of such pipe coil unit to the combining chamber of such injector, such conduit adapted for the return to the injector and so to the absorbing unit, of a portion of the strong liquor produced in the said unit, and means for flowing a cooling medium over such absorbing unit, said injector comprising an injector nozzle intermediate the points of connection of the source of gas supply and of the said return conduit to the combining space of such injector.

In testimony whereof I have signed this specification in the presence of two subscribing witnesses.

NICOLAI H. HILLER.

Witnesses:
H. M. MARBLE,
D. A. DAVIES.